(12) United States Patent
Levy

(10) Patent No.: US 9,174,429 B2
(45) Date of Patent: Nov. 3, 2015

(54) METHOD AND SYSTEM FOR THE PRODUCTION OF FRAME STRUCTURE FOR PRINTING PRESSES

(75) Inventor: Nathan A Levy, Raanana (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 634 days.

(21) Appl. No.: 13/282,050

(22) Filed: Oct. 26, 2011

(65) Prior Publication Data

US 2013/0106273 A1 May 2, 2013

(51) Int. Cl.
| F16B 1/00 | (2006.01) |
| F16B 9/00 | (2006.01) |
| F16L 41/00 | (2006.01) |
| B41F 13/00 | (2006.01) |
| F16B 12/46 | (2006.01) |

(52) U.S. Cl.
CPC ............. *B41F 13/0024* (2013.01); *F16B 12/46* (2013.01); *Y10T 403/42* (2015.01)

(58) Field of Classification Search
CPC ....... A47F 5/005; F16B 12/46; B41F 13/0024
USPC ......... 403/205, 217, 219, 231, 292, 295, 306, 403/308, 309–312, 403; 101/479, 480, 494; 400/691, 693; 248/676, 678, 174, 248/346.3; 312/111, 140, 238, 334.6; 29/525.01, 525.02

See application file for complete search history.

(56) References Cited

U.S. PATENT DOCUMENTS

| 3,913,289 | A | * | 10/1975 | Recker .......................... 312/140 |
| 4,045,104 | A | * | 8/1977 | Peterson .................... 312/265.4 |
| 4,242,969 | A | * | 1/1981 | Checkwood et al. .... 108/158.11 |
| 4,407,505 | A | * | 10/1983 | Kendziorski .................. 473/173 |
| 4,515,280 | A | * | 5/1985 | Sheu ............................. 211/189 |
| 4,930,930 | A | * | 6/1990 | Coppa ........................... 403/171 |
| 5,240,317 | A | * | 8/1993 | Presnick ....................... 312/263 |
| 5,302,039 | A | * | 4/1994 | Omholt ......................... 403/218 |
| 6,602,017 | B2 | * | 8/2003 | Overton et al. ............... 403/205 |
| 6,872,027 | B2 | * | 3/2005 | Ledingham ................. 403/400 |
| 7,226,234 | B2 | * | 6/2007 | Gordy et al. ................. 403/344 |
| 2004/0245513 | A1 | * | 12/2004 | Izumi ......................... 256/65.02 |
| 2006/0024128 | A1 | * | 2/2006 | Chiu ............................. 403/217 |
| 2009/0279946 | A1 | * | 11/2009 | Wingett et al. ............... 403/312 |

* cited by examiner

*Primary Examiner* — Gregory Binda
*Assistant Examiner* — Nahid Amiri

(57) ABSTRACT

A press cage may include pairs of opposing wall plates, each of the pairs of wall plates being orthogonal with respect to the other pairs, with corresponding machined indentations located at predetermined locations on broad faces of the wall plates which are adjacent to each other. The press cage may also include coupler assemblies made of coupler parts, each of the parts fixed to machined indentation of the corresponding machined indentations at one of the predetermined locations, the coupler parts locked together.

14 Claims, 6 Drawing Sheets

METHOD AND SYSTEM FOR THE PRODUCTION OF FRAME STRUCTURE FOR PRINTING PRESSES

BACKGROUND

A press machine (hereinafter referred to as "press") typically includes large and heavy drums that are made to roll during the printing process and transfer an image onto a substrate that is pressed by and made to travel between the drums. Old presses typically include frames made of assembled planar plates forming the walls of the frame. Assembly procedures of such frames are typically prone to adjustment problems and the alignment between rear and front walls is many times not satisfactory. Features are added to walls in order to address these problems, but machining these features requires machining of walls at their narrow lateral facet. In order to accomplish this special adaptors ("knees") on CNC machines are used, which affect precision and increase cost. On the other hand, handling, shipment and storage of machined plates in any stage of production is fairly easy. Recent frame designs are based on a "monolithic" cage. In producing a monolithic cage both rear and front sides of the cage are machined at once using a very large and precise milling machine, thus bypassing a long chain of tolerances that would have otherwise been needed, and eliminating assembly. First the cage is cast, then runners are removed and then the cage is subjected to machining in two stages—rough and final. Connecting and stabilizing beams connect the front wall to the rear wall, and bestow rigidity, stiffness and dimensional stability to the cage. In a monolithic cage those beams are cast along with the rear and front walls. Since outside dimensions of the cage determine the type and size of the milling machine capable of machining it, all connecting beams are designed to remain within the outermost perimeter of the cage. Machining requirements, especially part size and accuracy, impose a "size barrier" on the cage and there are only few machines available with such combinations of part size and accuracy.

The number and size of beams in a monolithic cage of a press are limited since the printing press is densely populated and a connecting beam may interfere with mounting and dismounting procedures of sub units of the cage. Size barrier and components density within the cage result in fewer beams, and the remaining beams have thin cross section. This consequently lowers the natural frequency of the cage. Loosing rigidity in this design also affects machining accuracy and dimensional stability of the cage, since fixing the cage on a CNC machine is more difficult. Logistics, too, is complex with monolithic cage design.

BRIEF DESCRIPTION OF THE DRAWINGS

Examples of the present invention are described in the following detailed description and illustrated in the accompanying drawings in which.

DETAILED DESCRIPTION

Figure 1:
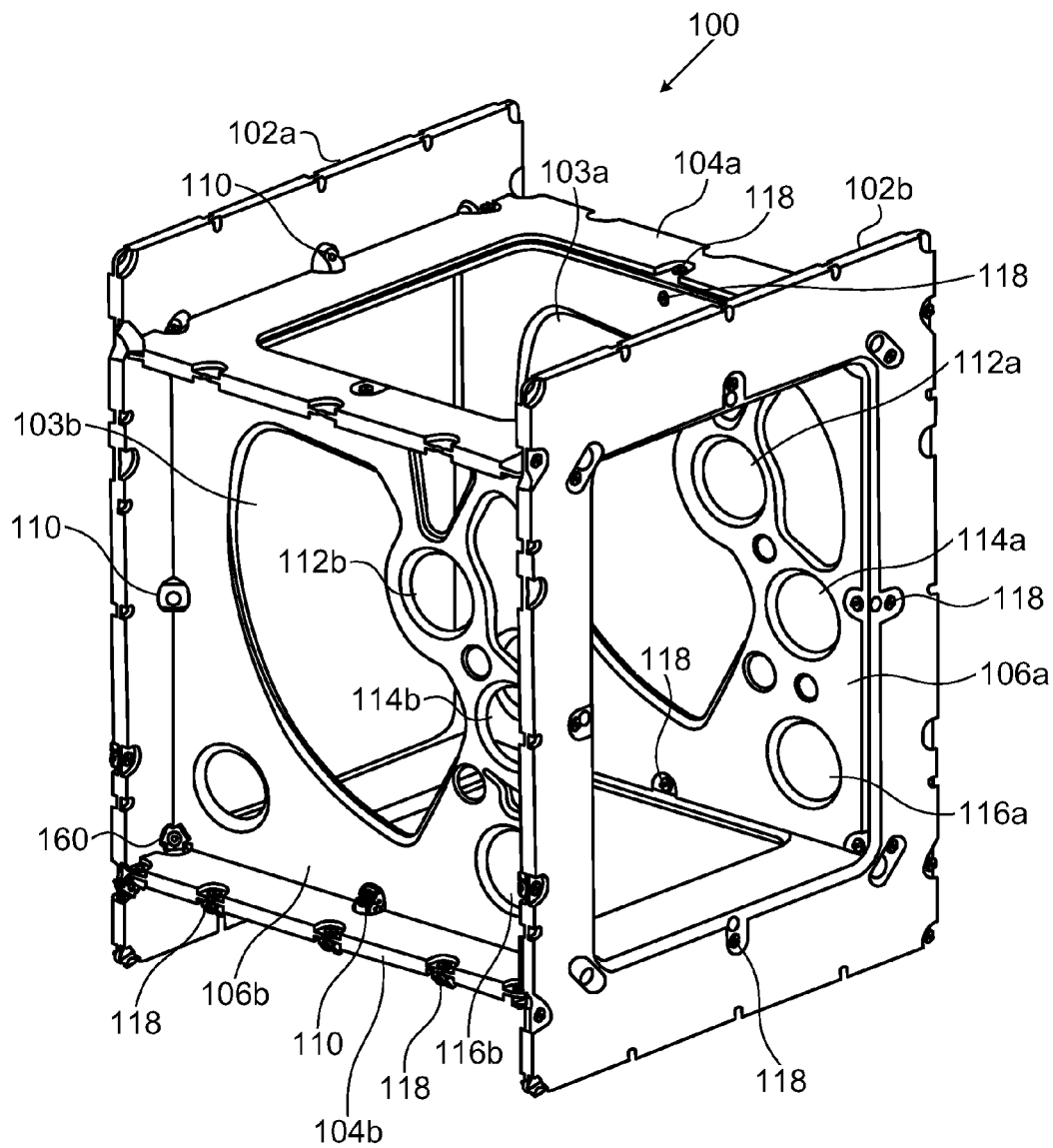
FIG. 1 illustrates a press cage comprising wall plates connected by coupler assemblies, in accordance with an example.

FIG. 1 illustrates a press cage 100 comprising wall plates connected by coupler assemblies, in accordance with an example. A pair of opposing support wall plates, 106a and 106b, may include three pairs of opposing circular bores 112a and 112b, 114a and 114b and 116a and 116b, (respectively) for supporting the ends of press drums (not shown in the figure) and maintaining the drums in an accurate alignment with respect to each other.

The opposing support wall plates 106a and 106b may be solid enough to withstand weight and the forces exerted by the drums when in operation, and may further include apertures 103a and 103b, respectively, to allow convenient access to the inside of the cage through these wall plates. Two additional pairs of side wall plates—102a and 102b, and 104a and 104b, respectively—complete the formation of the cage. The side wall plates may be provided in the form of frames (peripheral beams defining a large window within), so as to allow convenient access to the inside of the cage through the side walls.

Wall plates 102a, 102b, 104a, 104b, 106a and 106b of cage 100 do not necessarily need to be fully machined to offer accurate positioning and alignment. Instead, only predetermined locations on the broad facets (the "faces") of the plates, adjacent to the edges of the plates, may be machined to obtain machined indentations 118 exhibiting local accuracy. Machined indentations 118 of adjacent wall plates are designed to match and correlate so as to allow connecting the adjacent wall plates using coupler assemblies of at least two kinds—coupler assembly 110 for coupling two adjacent orthogonal wall plates, and coupler assembly 160 for coupling three adjacent orthogonal wall plates, as described and discussed hereinafter. According to an example an indentation is machined opposingly on both sides of the wall plate, exhibiting a narrower section of the wall plate with enhanced local accuracy.

Figure 2:
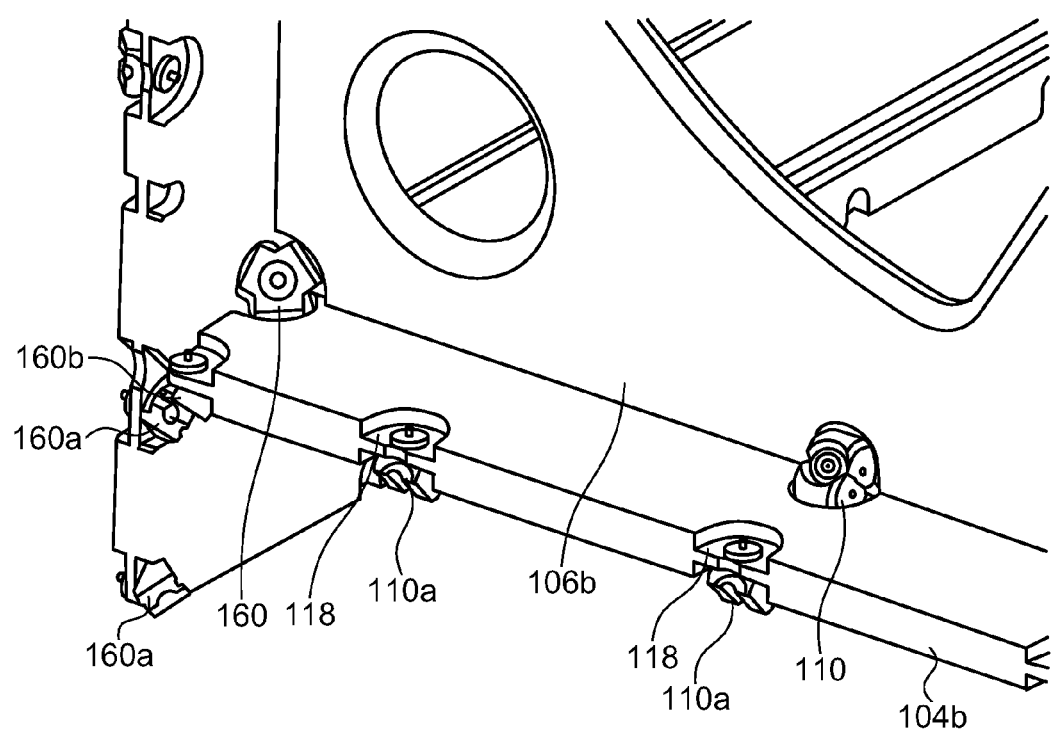
FIG. 2 illustrates a detail of the press cage shown in FIG. 1.

FIG. 2 illustrates a detail of press cage 100 shown in FIG. 1.

Predetermined locations on the broad facets (the "faces") of the wall plates, adjacent to the edges of the plates may be machined in the form of indentations 118. Indentations 118 located along the edge of a wall plate may be used for abutting coupler assemblies 110 for coupling two adjacent orthogonal wall plates, and indentations 118 located at corners of the wall plates may be used for abutting coupler assemblies 160 for coupling three adjacent orthogonal wall plates. Note that coupler assembly 110 for coupling two adjacent orthogonal wall plates, may comprise two identical parts (e.g. 110a, and see also FIG. 3A and FIG. 3B)—each of which is to be fixed to one of corresponding indentations 118, positioned in matching locations along the edges of two adjacent wall plates, whereas coupler assembly 160 for coupling three adjacent orthogonal wall plates may comprise three identical parts (e.g. 160a, 160b, 160c, see also FIG. 4), each of which is to be fixed to a corresponding indentation 118 at a shared corner of three adjacent orthogonal wall plates.

Figure 3A:
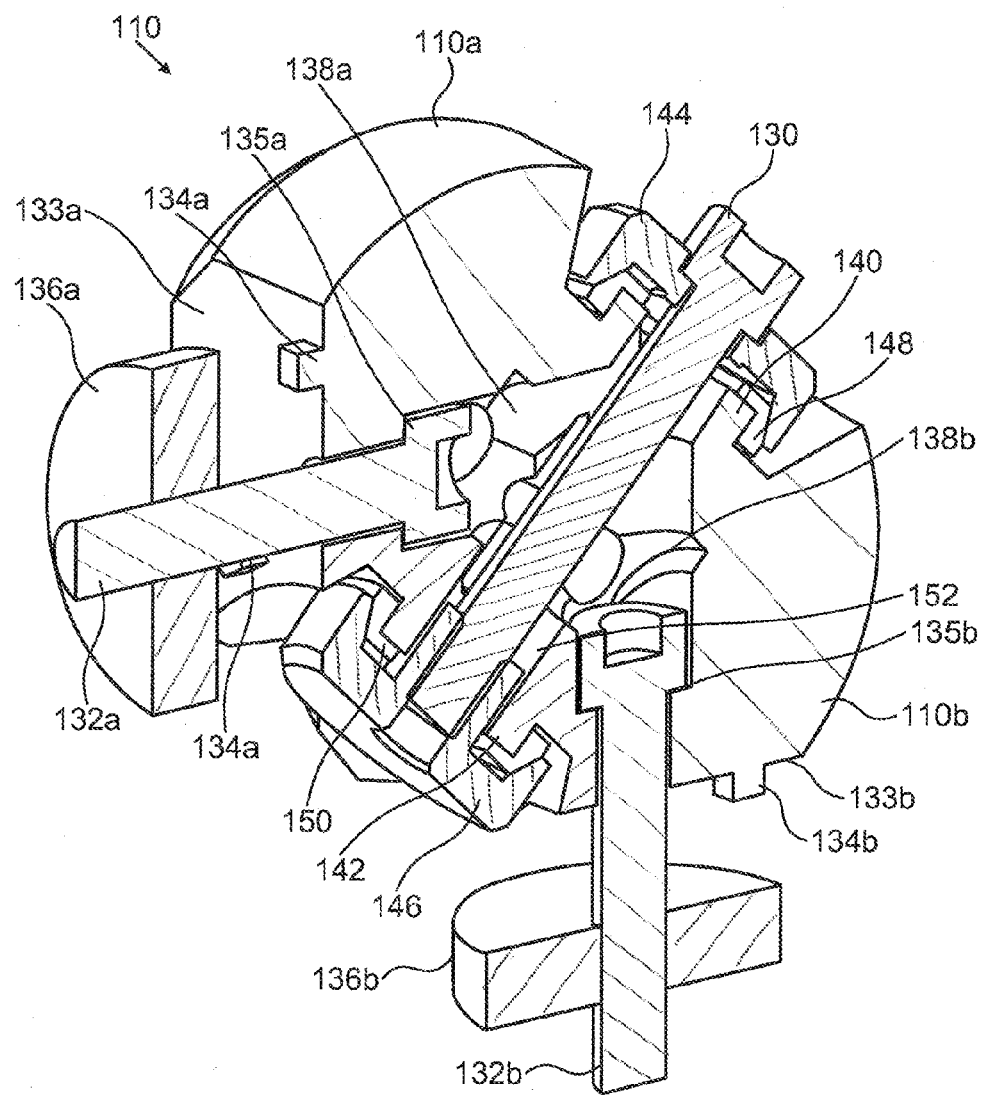
FIG. 3A illustrates a cross-sectional view of a coupler assembly for coupling two adjacent orthogonal walls, in accordance with an example.
Figure 3B:
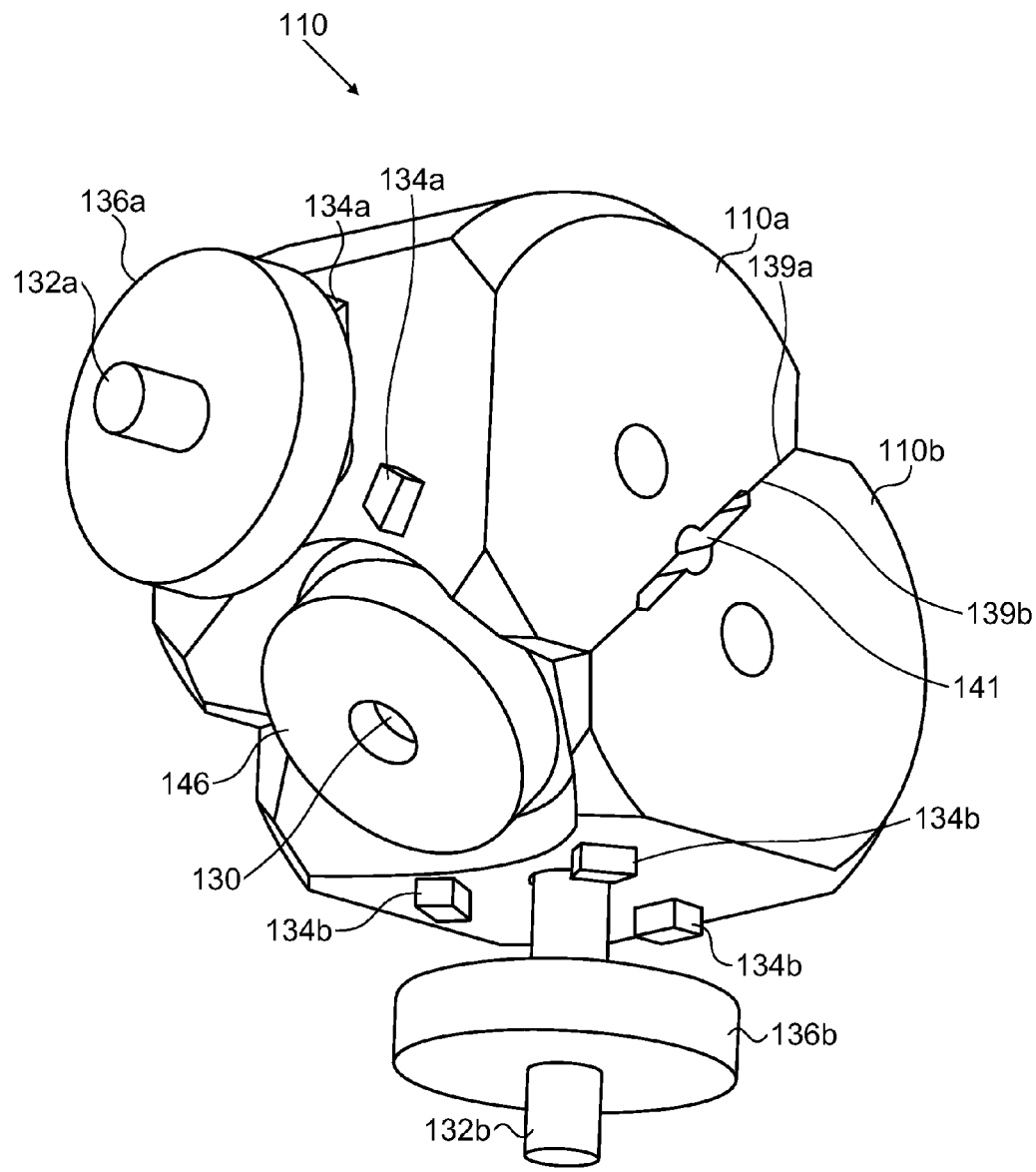
FIG. 3B illustrates an isometric view of the coupler shown in FIG. 3A

FIG. 3A illustrates a cross-sectional view of coupler assembly 110 for coupling two adjacent orthogonal wall plates, in accordance with an example. FIG. 3B illustrates an isometric view of the coupler shown in FIG. 3A

Coupler assembly 110 may comprise two identical coupler parts 110a and 110b, each of which is designed to be separately fixed to corresponding indentations 118 (see FIG. 1 and FIG. 2) and them locked together to form a rigid coupler. Each of coupler parts 110a and 11b includes a facet—133a and 133b respectively) which is designed to be placed in contact with its corresponding indentation 118.

Coupler part 110a (and 110b respectively) may be fixed to its corresponding indentation 118 by inserting a screw, 132a (and 132b respectively) through a bore 138a (and 138b respectively) passing through the coupler part, and threading it into a bore (not shown) through the machined indentation 118 of the wall plate and securing it firmly by nut 136a (and 136b respectively). The head of the screw is designed to rest on shoulder 135a (and 135b respectively) within bore 138a (and 138b respectively).

Coupler parts 110a and 110b include internally facing facets (139a and 139b in FIG. 3B) which are designed to be matchingly placed in contact. In an example, a void 141 may be located between the internally facing facets of the coupler parts. In an example, some of the internally facing facets 139a and 139b may be machined inwardly, creating void 141 between the juxtaposed coupler parts 110a and 110b. Bore 152 may extend across the internally facing facets to accommodate locking screw 130. Circular flanges, 140 and 142, may be provided on either sides of bore 152, on which fastening ring 148 and 150 may be placed and pressed firmly by caps 144 and 146 respectively, which are forced against each other by locking screw 130. Fastening ring 148 may be conical and slotted to facilitate appropriate fastening.

Protrusions 134a and 134b are designed to act as quasi-kinematic teeth locking the coupler parts in their respective position, by inserting protrusions 134a and 134b into matching longitudinal grooves (see FIG. 5) located on the machined facet of indentation 118, that allow motion along a radial axis with respect to the plane of the machined facet of the wall plate in which screw 132a (and 132b respectively) is inserted, but prevents motion in other directions along that plane.

To fit orthogonal wall configuration for the press cage, facets 133a and 133b, which are to be placed in contact with their corresponding indentations are planned to define 90 degrees between them, whereas the internally facing facets 139a and 139b define a shared plane which is 45 degrees with respect to either facets 133a and 133b. The shared plane may be inclined in other angles with respect to facets 133a and 133b, but if the coupler parts are to be identical then it is inclined in 45 degrees with respects to facets 133a and 133b, equally dividing the angle defined between these facets.

Figure 4:
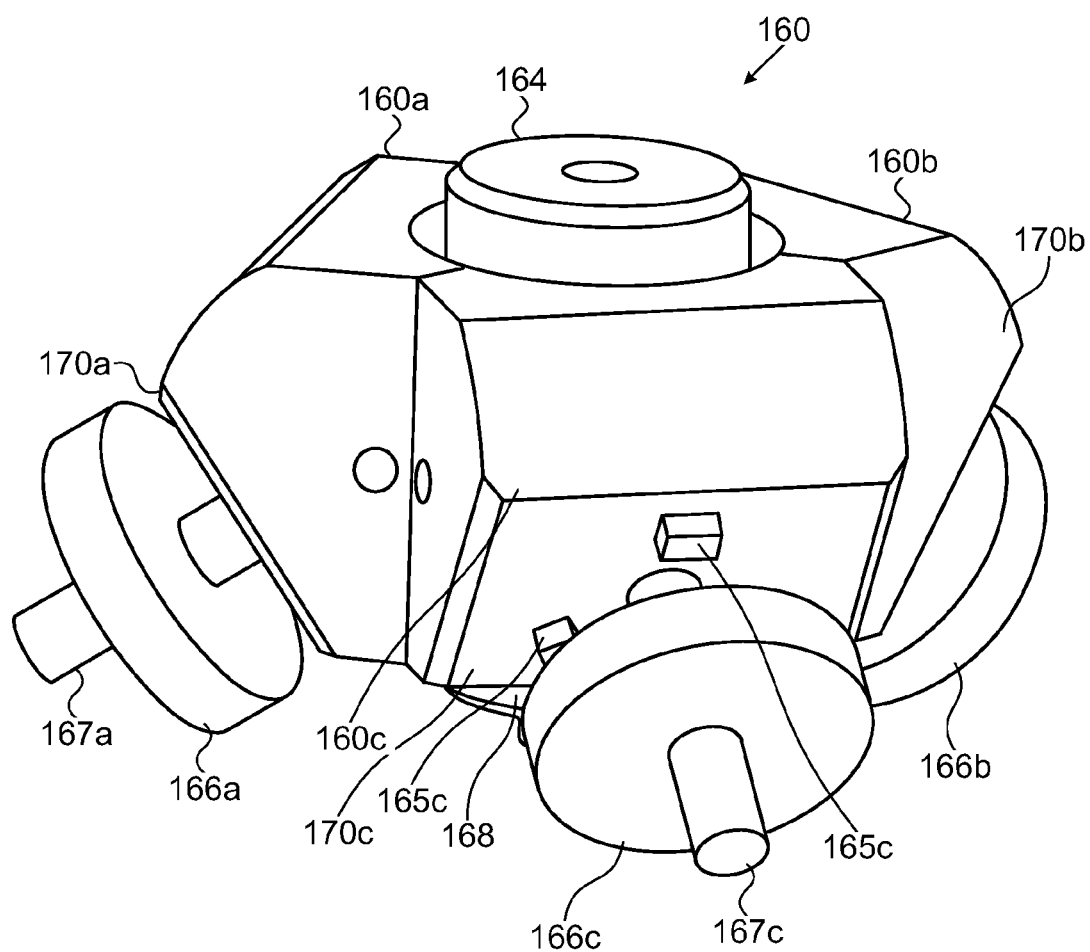
FIG. 4 illustrates an isometric view of a coupler assembly for coupling three adjacent orthogonal walls, in accordance with an example.

FIG. 4 illustrates an isometric view of coupler assembly 160 for coupling three adjacent orthogonal wall plates, in accordance with an example. Coupler assembly 160 may include three identical coupler parts 160a, 160b and 160c, whose design may be similar to the design of the coupler parts of coupler assembly 110 (see for example FIG. 3a). Facets 170a, 170b and 170c, which are designed to be placed in contact with indentations 118 at a corner of the orthogonal wall plates define three mutually orthogonal planes. These facets may include protrusions (e.g. 165c) for insertion into matching grooves on the machined facets of the indentations (like 134a, 134b of FIGS. 3A and 3B).

Each coupler part, 160a, 160b and 160c is fixed to its corresponding wall plate by screw 167a, 167c (the third screw not seen in this figure as it is hidden behind the coupler assembly) and corresponding nuts 166a, 166b and 166c.

Internally facing facets (not shown in the figure), each coupler part having two such facing facets, each designed to face a corresponding facet of either of the other two coupler parts. Thus three shared planes between the coupler parts define sectors of 60 degrees.

The three coupler parts share a bore in which a locking screw is accommodated, with a fastening ring (not shown—see FIG. 3A) and matching cap 164 and 168 respectively (similarly to the arrangement in FIG. 3A, with the obvious adjustments to facilitate a three piece coupler assembly instead of a two-piece coupler assembly).

Figure 5:
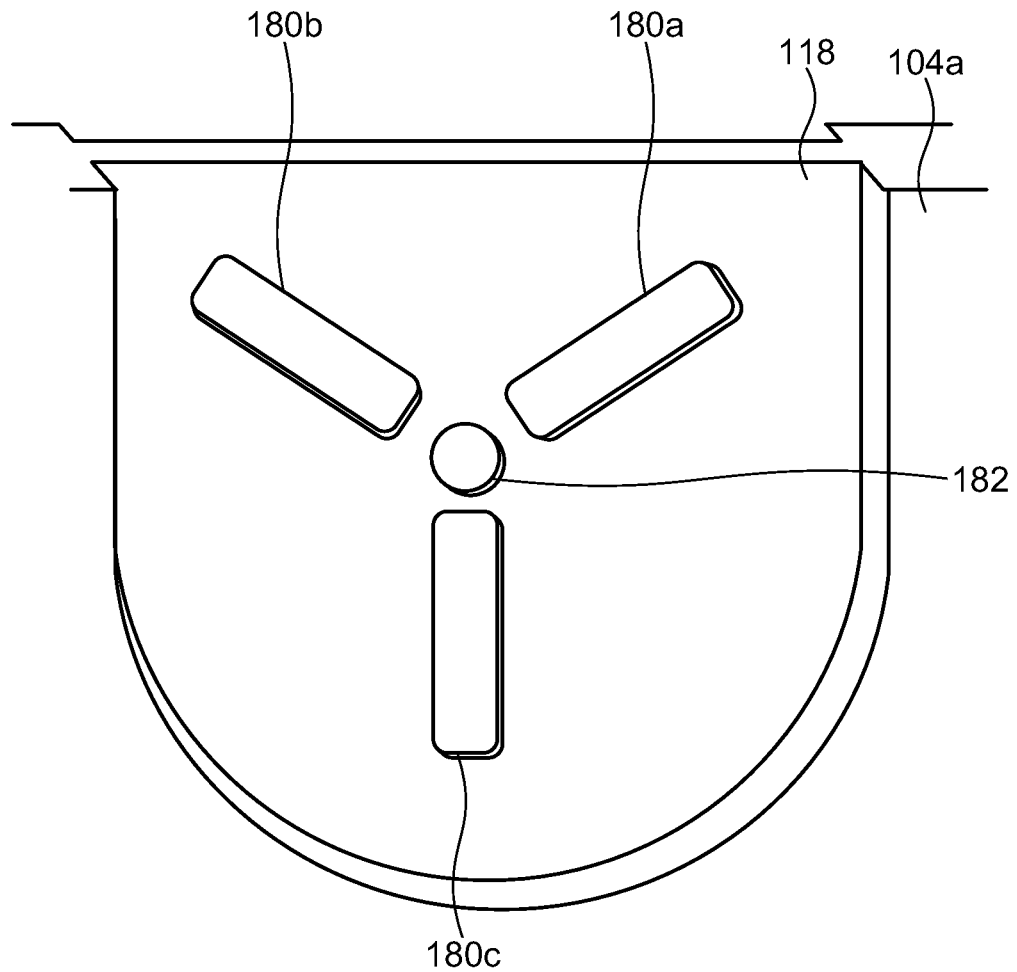
FIG. 5 illustrates a machines indentation of a wall plate of a press cage, in accordance with an example.

FIG. 5 illustrates a machined indentation of a wall plate of a press cage, in accordance with an example.

Wall plate 104a may include indentation 118, which may be accurately machined to the desired dimensions. Bore 182 may be provided for accommodating a screw for fixing a coupler part to that indentation. Longitudinal grooves 180a, 180b and 180c may be provided on the facet of indentation 118, arranged in a radial orientation with respect to bore 182, and which may accommodate corresponding protrusions on the facet on the coupler part which is designed to be placed in contact with the indentation. In doing so the alignment and orientation of the coupler part may be well defined and maintained.

Thanks to the short chain of tolerances and the high repeatability of kinematic coupling, the accumulated mismatch of assembled coupler parts may reflect CNC machining positional accuracy, with error small enough to be within elastic deflection of all assembled parts.

Building a press cage using wall plates which are only machined in predetermined locations on the facing facets of the plates, as well as using coupler assemblies in accordance with the examples, allows retaining the advantages of using plates for building a press cage instead of machining huge structures while eliminating many disadvantages traditionally associated with plates.

In this design, there is practically no adjustment required to achieve alignment and accuracy. The coupler assemblies facilitate increasing the size of the frame outside the cage with practically no size barrier (or at least greatly increasing possible dimensions for press cages, previously limited by the size of the milling equipment. Positioning the beams of the wall plates outside the space within the cage leaves a "beam free" void within the cage which may be used. In accordance with examples, there is only "face milling" of the wall plates and no need for milling lateral faces of the plates. The use of quasi-kinematic fastening arrangement allows for precise fastening of the wall plates together. Thus, high accuracy of alignment may be reached between the opposing supporting walls. Assembly of a press cage thus only requires placing the coupler parts in place and use screws with no further adjustment.

The cage wall plates, as well as coupler parts of the coupler assembly, in accordance with examples, may be made from various rigid and durable materials, such as, for example, metals (e.g. steel, aluminum). Other materials may be considered as well.

What is claimed is:

1. A coupler assembly for coupling adjacent orthogonal wall plates, the coupler assembly comprising:
    coupler parts, each of the coupler parts comprising:
        an outer facet configured to contact a respective machined indentation of corresponding machined indentations located at predetermined locations on broad faces of the orthogonal wall plates which are adjacent to each other, the outer facet including a first member to engage a second member of a respective one of the machined indentations, the first member including a protrusion to engage a groove of the second member, the outer facet of one of the coupler parts being orthogonal to the outer facet of another one of the coupler parts, and the coupler parts having adjacent internally facing facets, wherein the coupler parts are identical, wherein a bore extends between the internally facing facets of the coupler parts; and a locking mechanism comprising a locking screw extending through the bore to lock the coupler parts together.

2. The coupler assembly of claim 1, wherein the coupler parts are configured to couple three adjacent orthogonal wall plates.

3. The coupler assembly of claim 2, comprising three coupler parts.

4. The coupler assembly of claim 1, wherein the coupler parts are made of metal.

5. The coupler assembly of claim 4, wherein the metal is selected from the group consisting of steel and aluminum.

6. The coupler assembly of claim 1, wherein the internally facing facet of a first of the coupler parts is angled with respect to the outer facet of the first coupler part, and the internally facing facet of a second of the coupler parts is angled with respect to the outer facet of the second coupler part.

7. The coupler assembly of claim 6, wherein the internally facing facet of the first coupler part is at a 45° angle with respect to the outer facet of the first coupler part, and the internally facing facet of the second coupler part is at a 45° angle with respect to the outer facet of the second coupler part.

8. The coupler assembly of claim 3, wherein the internally facing facet of a first of the three coupler parts is angled with respect to the outer facet of the first coupler part, the internally facing facet of a second of the three coupler parts is angled with respect to the outer facet of the second coupler part, and the internally facing facet of a third of the three coupler parts is angled with respect to the outer facet of the third coupler part.

9. A coupler assembly for coupling adjacent orthogonal wall plates, the coupler assembly comprising:

coupler parts, each of the coupler parts comprising:

an outer facet configured to contact a respective machined indentation of corresponding machined indentations located at predetermined locations on broad faces of the orthogonal wall plates which are adjacent to each other, the outer facet including a first member to engage a second member of a respective one of the machined indentations, the first member including a protrusion to engage a groove of the second member, the outer facet of one of the coupler parts being orthogonal to the outer facet of another one of the coupler parts, and the coupler parts having adjacent internally facing facets;

a locking mechanism to lock the coupler parts together, wherein the locking mechanism comprises a locking screw; and screws, wherein each of the coupler parts includes a bore for accommodating a respective screw of the screws to fix the respective one of the coupler parts to the corresponding machined indentation, and wherein a bore extends between the internally facing facets of the coupler parts to accommodate the locking screw of the locking mechanism.

10. The coupler assembly of claim 9, further comprising:

flanges on first and second sides of the bore extending between the internally facing facets of the coupler parts, and fastening rings placed on the respective flanges.

11. A method of forming a coupler assembly for coupling adjacent orthogonal wall plates, the method comprising:

arranging a plurality of coupler parts of the coupler assembly for fixing to the orthogonal wall plates, each of the coupler parts comprising:

an outer facet configured to contact a respective machined indentation of corresponding machined indentations located at predetermined locations on broad faces of the orthogonal wall plates which are adjacent to each other, the outer facet including a first member to engage a second member of a respective one of the machined indentations, the first member including a protrusion to engage a groove of the second member, the outer facet of one of the coupler parts being orthogonal to the outer facet of another one of the coupler parts, and the coupler parts having adjacent internally facing facets, wherein the internally facing facet of a first of the coupler parts is angled with respect to the outer facet of the first coupler part, and the internally facing facet of a second of the coupler parts is angled with respect to the outer facet of the second coupler part, and wherein a bore extends between the internally facing facets of the coupler parts; and locking, using a locking mechanism comprising a locking screw extending through the bore, the coupler parts together.

12. The method of claim 11, wherein arranging the plurality of coupler parts comprises arranging the internally facing facet of the first coupler part at a 45° angle with respect to the outer facet of the first coupler part, and arranging the internally facing facet of the second coupler part at a 45° angle with respect to the outer facet of the second coupler part.

13. The method of claim 11, wherein arranging the plurality of coupler parts comprises arranging the internally facing facet of a third of the coupler parts angled with respect to the outer facet of the third coupler part.

14. The method of claim 11, further comprising providing screws, wherein each of the coupler parts includes a bore for accommodating a respective screw of the screws to fix the respective one of the coupler parts to the corresponding machined indentation.

* * * * *